United States Patent
Childress et al.

(10) Patent No.: US 7,103,810 B2
(45) Date of Patent: Sep. 5, 2006

(54) SYSTEM FOR THE TRACKING OF ERRORS IN A COMMUNICATION NETWORK ENABLING USERS TO SELECTIVELY BYPASS SYSTEM ERROR LOGS AND MAKE REAL-TIME RESPONSES TO DETECTED ERRORS

(75) Inventors: Rhonda L. Childress, Austin, TX (US); Mark Anthony Laney, Round Rock, TX (US); Neil Raymond Pennell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 10/125,629

(22) Filed: Apr. 18, 2002

(65) Prior Publication Data

US 2003/0208590 A1    Nov. 6, 2003

(51) Int. Cl.
 *G06F 11/00*     (2006.01)
 *G06F 15/173*    (2006.01)
(52) U.S. Cl. .............................. 714/57; 714/4; 709/224
(58) Field of Classification Search ................ 709/224, 709/204–207; 714/47–57, 4
See application file for complete search history.

(56) References Cited

U.S. PATENT DOCUMENTS

| | | | | |
|---|---|---|---|---|
| 5,442,639 A * | 8/1995 | Crowder et al. | ............. | 714/712 |
| 5,850,386 A * | 12/1998 | Anderson et al. | ............. | 370/241 |
| 5,850,388 A * | 12/1998 | Anderson et al. | ............. | 370/252 |
| 5,850,523 A * | 12/1998 | Gretta, Jr. | ............. | 709/224 |
| 5,925,126 A * | 7/1999 | Hsieh | ............. | 713/200 |
| 5,961,594 A * | 10/1999 | Bouvier et al. | ............. | 709/223 |
| 5,974,457 A * | 10/1999 | Waclawsky et al. | ......... | 709/224 |
| 5,991,881 A * | 11/1999 | Conklin et al. | ............. | 726/22 |
| 6,092,087 A | 7/2000 | Mastors | ............. | 707/202 |
| 6,148,338 A | 11/2000 | Lachelt et al. | ............. | 709/224 |
| 6,240,450 B1 * | 5/2001 | Sharples et al. | ............. | 709/224 |
| 6,282,546 B1 * | 8/2001 | Gleichauf et al. | ............. | 707/102 |
| 6,304,635 B1 | 10/2001 | Iwami et al. | ............. | 379/34 |
| 6,336,141 B1 | 1/2002 | Fujiyama et al. | ............. | 709/224 |
| 6,424,872 B1 * | 7/2002 | Glanzer et al. | ............. | 700/18 |
| 6,493,755 B1 * | 12/2002 | Hansen et al. | ............. | 709/224 |
| 6,594,786 B1 * | 7/2003 | Connelly et al. | ............. | 714/50 |
| 6,816,899 B1 * | 11/2004 | Meah | ............. | 709/225 |
| 2002/0038362 A1 * | 3/2002 | Bhatia et al. | ............. | 709/224 |
| 2002/0194319 A1 * | 12/2002 | Ritche | ............. | 709/223 |
| 2003/0101386 A1 * | 5/2003 | Brouet et al. | ............. | 714/704 |
| 2005/0021836 A1 * | 1/2005 | Reed et al. | ............. | 709/238 |
| 2005/0028171 A1 * | 2/2005 | Kougiouris et al. | ........ | 719/318 |

\* cited by examiner

*Primary Examiner*—Ario Etienne
*Assistant Examiner*—Philip S. Scuderi
(74) *Attorney, Agent, or Firm*—J. B. Kraft; David A. Mims, Jr.

(57) ABSTRACT

Enabling users of systems maintaining periodically sampled error logs to selectively make real-time responses to certain error conditions. An error management system which comprises an implementation for monitoring error conditions and responsive to the monitoring for recording the error conditions in an error log together with an implementation for periodically sampling said error log for said error conditions. The user is enabled to sense one or more of the error conditions prior to the periodic sampling of the condition in the error log to thereby bypass the error log sampling to provide for a possible real-time response to a sensed error condition. The implementations for monitoring, for recording, for sampling and for the real-time sensing are preferably in the server computer.

15 Claims, 5 Drawing Sheets

SYSTEM FOR THE TRACKING OF ERRORS IN A COMMUNICATION NETWORK ENABLING USERS TO SELECTIVELY BYPASS SYSTEM ERROR LOGS AND MAKE REAL-TIME RESPONSES TO DETECTED ERRORS

TECHNICAL FIELD

The present invention relates to computer managed communication networks such as the World Wide Web (Web) and, particularly, to the tracking of and response to errors recorded in error logs.

BACKGROUND OF RELATED ART

Error logs have been implemented in communications systems for almost as long as communication systems have existed. Error logs are normally maintained as files in the communication network servers that serve the client computers in the network. The error log maintains a record of everything that went wrong while the server was running. It also contains diagnostic messages, such as notifications of when the particular server was started or shut down. The user is enabled to set his error log level to control the number and type of messages that will be in his error log file. The errors may be in several categories, e.g. document errors such as "document not found"; communication errors, on the Web, for example, CGI (Common Gateway Interface) errors; as well as "server start", "server stop messages". Thus, entries are made to error logs on server stop/start, access failures, lost connections, timeouts and cancellations by visitors. Error logs, and particularly Web applications thereof, are generally described in the text, *Internet, The Complete Reference, Millennium Edition*, Margaret L. Young et al., Osborne/McGraw-Hill, Berkeley, Calif., 1999 at Chapter 32, *Analyzing Web Traffic* at pp. 755–768.

Conventionally, such communication error logs were used for diagnostic or trouble-shooting purposes in response to server or other communication shortcomings or failures. Consequently, the error data was sensed or listened for at selected points or nodes in the server controlled communications and the data, indicative of particular error conditions, stored in error log files in association with the communication network servers. Then the stored data in the error log was periodically sampled in regular cycles.

However, over the past decade, data communications has been greatly changed through the rapid development of the Internet or Web with its related distribution of documents, media and files. The convergence of the electronic entertainment and consumer industries with data processing exponentially accelerated the demand for wide ranging communication distribution channels, and the Web or Internet, which had quietly existed for over a generation as a loose academic and government data distribution facility, reached "critical mass" and commenced a period of phenomenal expansion. With this expansion, businesses and consumers have direct access to all matter of documents and computer files. This rapid expansion has brought hundreds of millions of Web users at hundreds of millions of Web stations, i.e. client computer stations, to the Web.

Because of the varying business needs involved, many of these users of communication systems customers have shown dissatisfaction with conventional error logging, and are seeking to be able to make real-time responses to certain error conditions.

SUMMARY OF THE PRESENT INVENTION

The present invention provides a solution to the problem of enabling users of systems maintaining periodically sampled error logs to selectively make real-time responses to certain error conditions.

The present invention applies to a computer managed communication network with user access via a plurality of client computer stations connected to the network through a server computer such as the Internet or Web (the two terms are used synonymously). The invention provides an error management system that comprises means for monitoring error conditions, means responsive to the monitoring means for recording the error conditions in an error log together with means for periodically sampling said error log for said error conditions. The invention implements means responsive to said monitoring means for enabling the sensing of one or more of the error conditions prior to the periodic sampling of the condition in the error log to thereby bypass said error log sampling to provide for a possible real-time response to a sensed error condition. The means for monitoring, the means for recording, the means for sampling and the means for sensing are preferably in the server computer.

The invention may be implemented through a tap for duplicating data representative of said error conditions being recorded in said error log. In other words, at the points in the communication or transmission of data at which monitoring or sensing for error conditions is normally carried out, a tap is inserted that duplicates the data indicative of the error condition that is to be recorded in the error log. The duplicate data resulting from the tap may then be listened for and used to respond to or control the error condition on a real-time basis.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Before going further into the details of specific embodiments, it will be helpful to understand from a more general perspective the various elements and methods that may be related to the present invention. Since a major aspect of the present invention is directed to documents, pages or files transmitted over global networks, such as the Web or Internet, an understanding of networks and their operating principles would be helpful. We will not go into great detail in describing the networks to which the present invention is applicable. For details on Web nodes, objects and links, reference is made to the text, *Mastering the Internet*, G. H. Cady et al., published by Sybex Inc., Alameda, Calif., 1996; or the previously mentioned text by Margaret Young et al.

Any data communication system that interconnects or links computer controlled systems with various sites defines a communications network. Of course, the Internet or Web are a global network of a heterogeneous mix of computer technologies and operating systems. Higher level objects are linked to the lower level objects in the hierarchy through a variety of network server computers. These network servers are the key to network distribution, such as the distribution of Web documentation.

Figure 1:
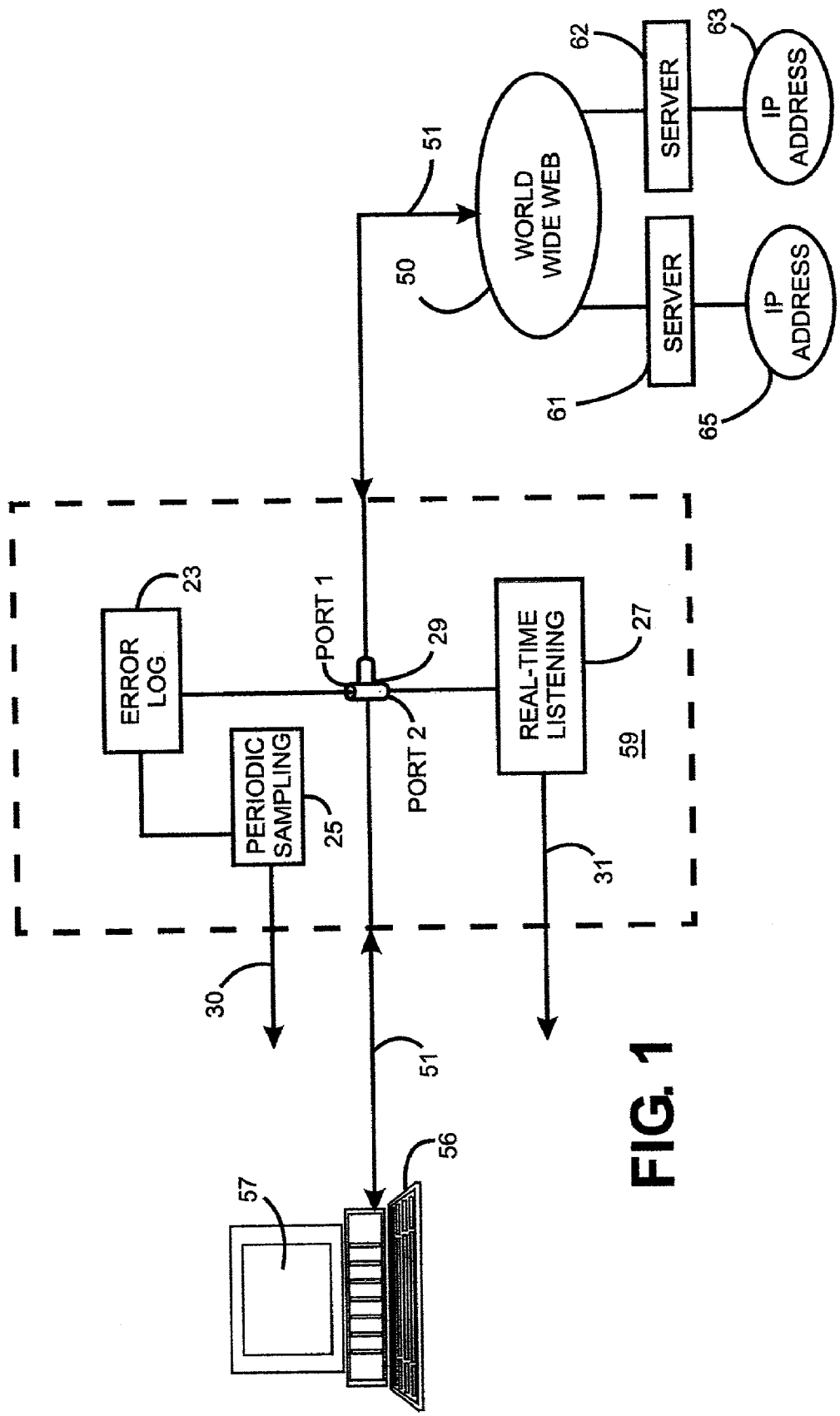
FIG. 1 is a generalized diagrammatic view of a portion of a network related to the World Wide Web upon which the present invention may be implemented.

Referring to FIG. 1, there is shown a generalized diagram of a portion of a network in which the present invention may be implemented. Client computer display terminal 56 with display 57 is one of a group of client computers that communicate through server 59 and line route 51 to the Web 50. The functions of the present invention are implemented within server 59 that connects communications to and from client 56 and the Web 50. Server 59 may be a server in a private network, such as a business or institutional network, of server 59 may be a server provided by an Internet Service Provider to client computers 56. Reference may be made to the above-mentioned *Mastering the Internet*, pp. 136–147, for typical connections between local client computers to the Web via network servers, any of which may be used to implement the system on which this invention is used.

As set forth above, the Web is made up of a hierarchy of servers connecting the requesting client computer display stations to the Web documents and file distribution sites or resource locations that are addressed or accessed through a Uniform Resource Location (URL). Thus, a request from a client station to a resource location and the resulting transmission of a Web document back to the client may involve a path of several servers. Any server along such a path may be set up to receive the tracked information of this invention. For simplicity in illustration, we will describe the sending of the tracked data on transmission characteristics to the servers for directly accessing the resource locations, e.g. Web sites. These resource accessing servers are most likely to find the tracked data of great value. Server 61 accessing resource 65 and server 62 accessing resource 63 are illustrative of such servers. The error logging and control are carried out in server 59. If this were conventional error monitoring and logging the monitoring would be carried out at a number of points or ports along the communication route 51 from client 56 to and from the Web 50. Port 1 is illustrative of such ports. A detected error condition from Port 1 is stored in Error Log file 23 in server 59 where it is periodically monitored by sampling unit 25 which provides a periodic output 30. In the present invention there is a tap 29 formed at Port 1 that splits the output into Port 1 and Port 2. Thus, in addition to the conventional output to the error log at Port 1, there is provided at Port 2 a duplicate of the error condition output that may be monitored on a real-time basis by listening unit 27 to provide a real-time output 31 that, in turn, is available for whatever real-time routine the user wishes to process the detected error condition with.

Figure 2:
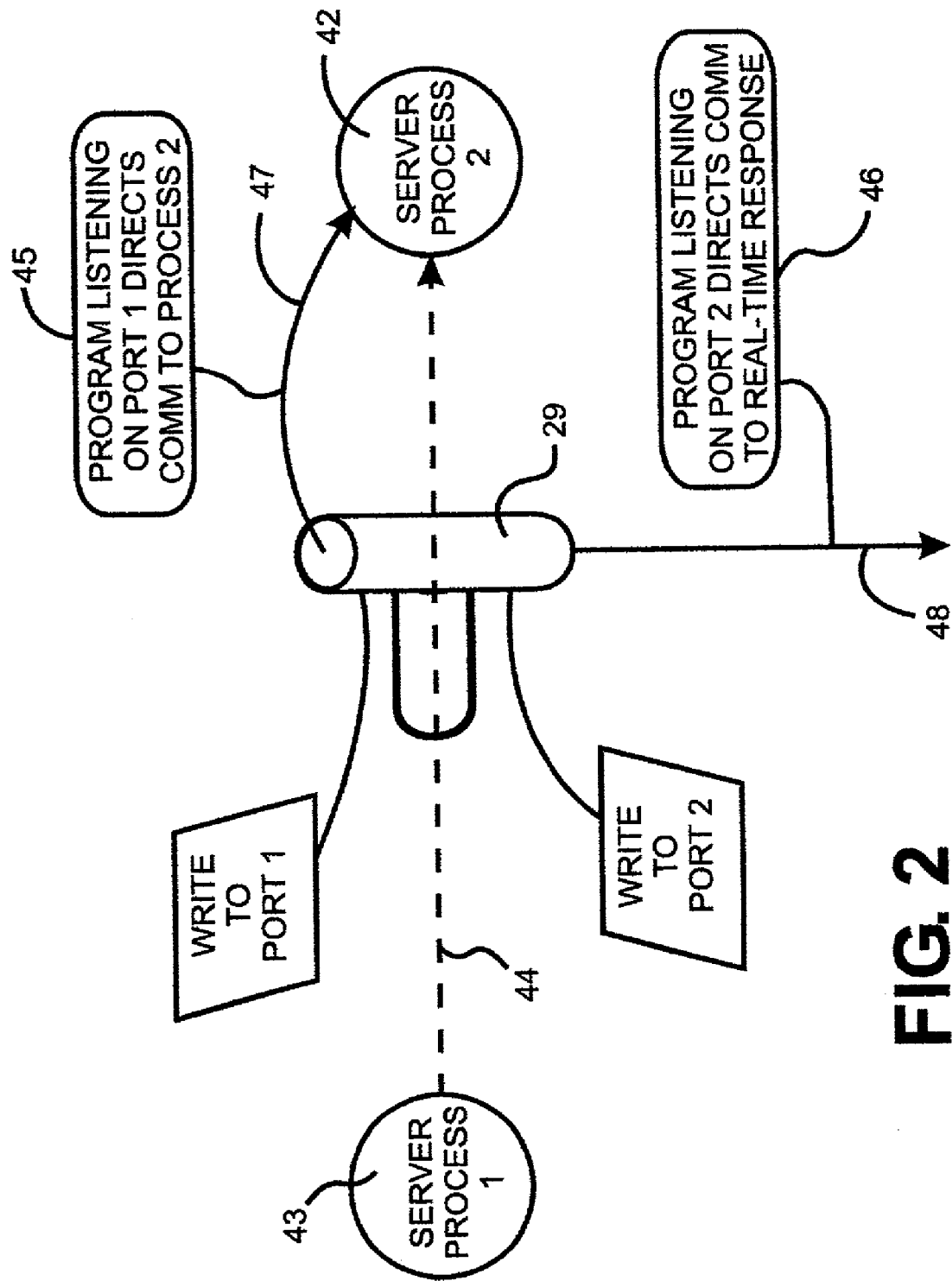
FIG. 2 is a generalized diagrammatic view of a server system to illustrate how an error listening port may be duplicated to provide the duplicate error outputs of the present invention.

The programming within server 59 is illustrated in the logical diagram of FIG. 2. There is a communications route 44 between Server Process 1, 43 and Server Process 2, 42. At the point of error condition monitoring, tap 29 splits the error condition output into duplicate outputs, one of which is written to Port 1 and the other to Port 2. The output at Port 1 is listened for 45 by a conventional error logging routine that directs the communication 47 to Server Process 42 and also conventionally logs the error condition to an error log file that is subsequently periodically sampled. The output at Port 2 is listened for 46 by a routine that provides an output representative of the error condition that is available to be responded to on a real-time basis by any routine devised by the user or customer at the client computer appropriate to the user's needs.

Figure 3:
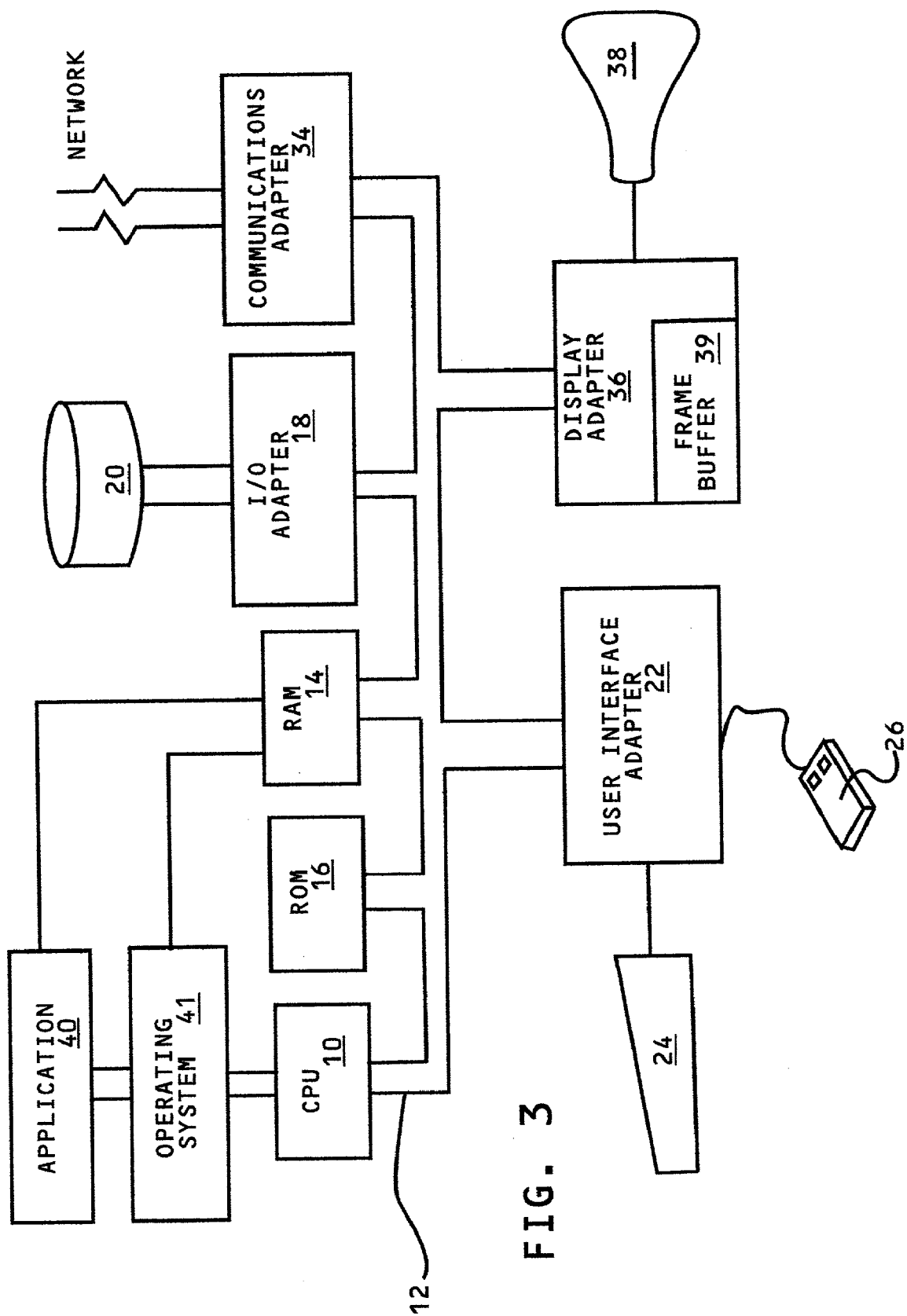
FIG. 3 is a block diagram of a data processing system including a central processing unit and network connections via a communications adapter that is capable of implementing a user interactive client station as well as the server in accordance with the present invention.

The server 59, as well as the client computers 56, may be implemented by a typical data processing system as shown in FIG. 3. A central processing unit (CPU) 10, such as any PC microprocessor in a PC available from International Business Machines Corporation (IBM) or Dell Corp., is provided and interconnected to various other components by system bus 12. An operating system 41 runs on CPU 10, provides control and is used to coordinate the function of the various components of FIG. 1. Operating system 41 may be one of the commercially available operating systems such as Microsoft's Windows98™ or WindowsNT™, as well as the UNIX or AIX operating systems. Application programs that include routines for monitoring, logging and responding to error conditions, as previously described, run in conjunction with operating system 41 in the server to provide output calls to the operating system 41, which, in turn, implement the various functions to be performed by the application 40. A Read Only Memory (ROM) 16 is connected to CPU 10 via bus 12 and includes the Basic Input/Output System (BIOS) that controls the basic computer functions. Random Access Memory (RAM) 14, I/O adapter 18 and communications adapter 34 are also interconnected to system bus 12. It should be noted that software components, including operating system 41 and application 40 are loaded into RAM 14, which is the computer system's main memory. I/O adapter 18 may be a Small Computer System Interface (SCSI) adapter that communicates with the disk storage device 20, i.e. a hard drive. Communications adapter 34 interconnects bus 12 with an outside network enabling the data processing system to communicate with other such systems over a Local Area Network (LAN) or Wide Area Network (WAN), which includes, of course, the Internet or Web. I/O devices are also connected to system bus 12 via user interface adapter 22 and display adapter 36. Keyboard 24 and mouse 26 are all interconnected to bus 12 through user interface adapter 22. Mouse 26 operates in a conventional manner insofar as user movement is concerned. In the client display, and in any display associated with the server, display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned mouse or related devices, a user is capable of inputting information to the system through the keyboard 24 or mouse 26 and receiving output information from the system via display 38.

Figure 4:
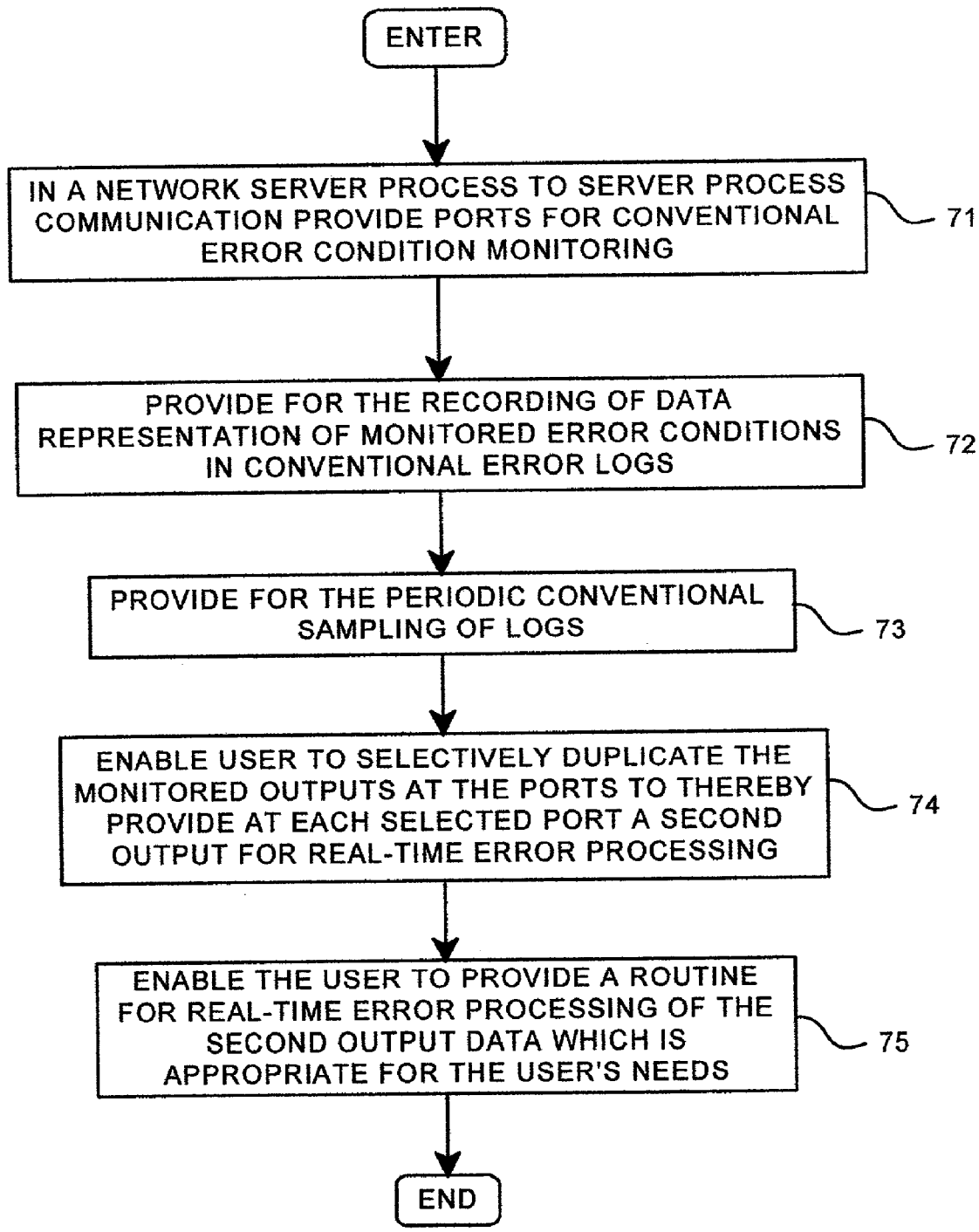
FIG. 4 is an illustrative flowchart describing the setting up of the elements needed for the program for enabling users of systems maintaining periodically sampled error logs to selectively make real-time responses to certain error conditions.
Figure 5:
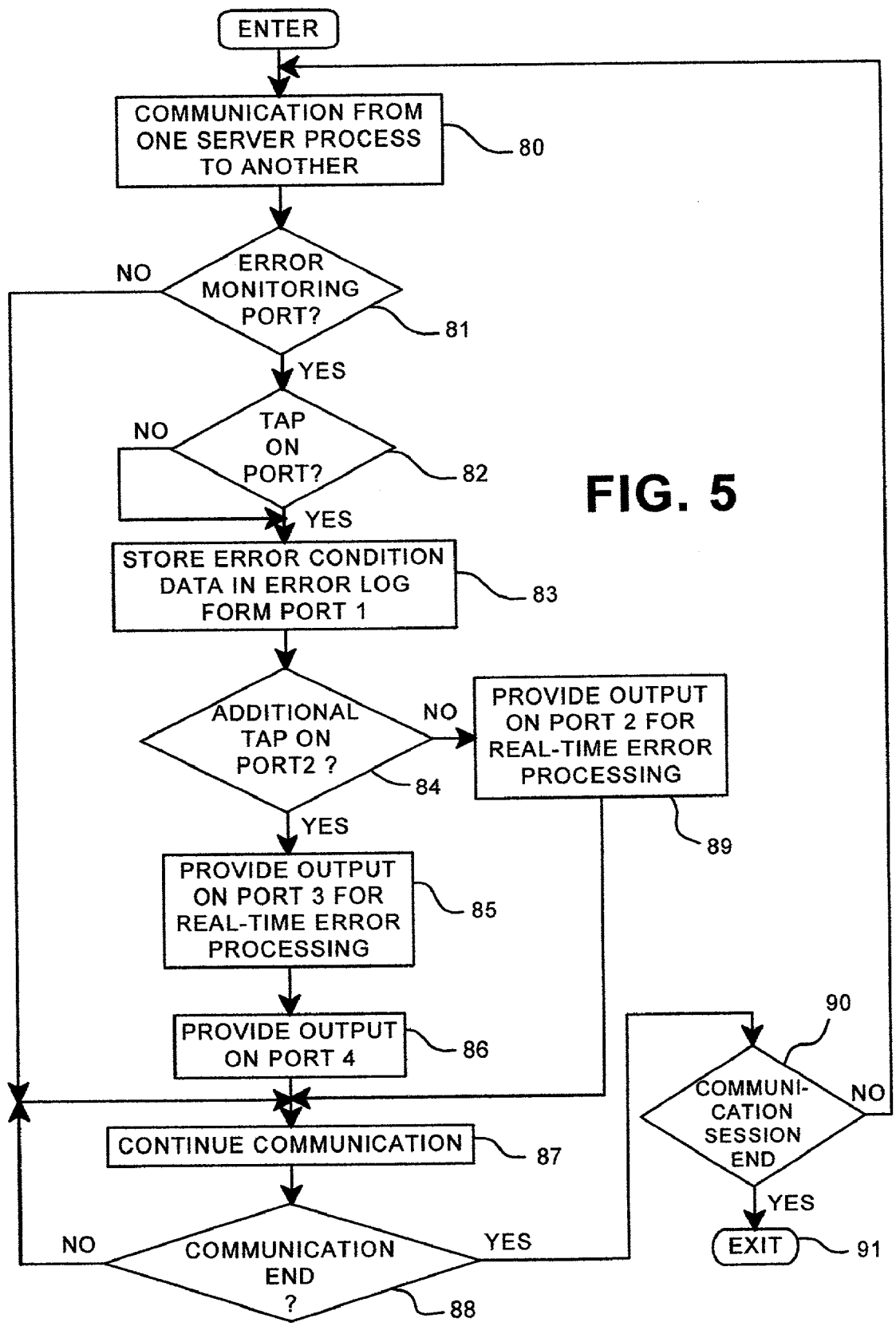
FIG. 5 is a flowchart of an illustrative run of a program set up in accordance with FIG. 4.

Now, with reference to FIGS. 4 and 5, we will describe a process implemented by the present invention in conjunction with the flowcharts of these figures. FIG. 4 is a flowchart showing the development of a process according to the present invention for enabling users of systems maintaining periodically sampled error logs to selectively make real-time responses to certain error conditions. In a network server process to server process communications connection, provide ports for conventional error condition monitoring, step 71. Provision is also made for the recording of data representative of monitored error conditions in conventional error logs, step 72. Conventional sampling of the error logs is also provided for, step 73. The user is enabled to selectively duplicate the monitored outputs at the ports so that there will be provided at each selected port a second output for real-time error processing, step 74. Finally, the user is enabled to provide routines for real-time error processing of the second output data that is appropriate for the user's needs.

An illustrative run of the process set up in FIG. 4 will now be described with respect to FIG. 5. First, step 80, a communication from one server process to another is monitored. Then, a determination is made as to whether we are at an error monitoring port, step 81. If No, the process proceeds to step 87 where the communication is continued. If Yes, a further determination is made as to whether there is a tap on the port, step 82. If Yes, the error condition data from Port 1 is recorded in the error log, step 83, and a further determination is made, step 84, as to whether there is an additional tap on Port 2. If the determination in step 82 is No tap, then the error condition data is routinely recorded in the error log but the determination in step 84 need not be done. In any event, if the determination in step 84 is No, there is not another tap, then an output is provided on Port 2, step 89, for real-time error processing. In addition, if the determination in step 84 is Yes, there is an additional tap, then, step 85, an additional output for further error processing or other real-time function is provided. In this manner, the taps on the ports may be sequenced to provide a sequence of cascaded outputs, e.g. an additional output on Port 4, step 86.

At this point, the server process to server process communication is continued, step 87. Next, a determination may conveniently be made as to whether the communication is at an end, step 88. If No, the process is returned to step 87 where the communication is continued. If Yes, then a further determination is made as to whether the whole communication session is at an end, step 90. If Yes, the session is exited, step 91. If No, the process is returned to initial step 80 where the next server process to server process communication is made.

One of the implementations of the present invention is as an application program 40 made up of programming steps or instructions resident in RAM 14, FIG. 1, during computer operations. Until required by the computer system, the program instructions may be stored in another readable medium, e.g. in disk drive 20 or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a computer managed communication network with user access via a plurality of client computer stations connected to the network through a server computer, an error management system comprising:
   means for monitoring error conditions;
   means responsive to said monitoring means for recording said error conditions in an error log;
   means for periodically sampling said error log for said error conditions;
   means responsive to said monitoring means for enabling the sensing of at least one of said error conditions prior to the periodic sampling of the condition to thereby bypass said error log sampling; and
   means, responsive to the sensing of one of said error conditions prior to said periodic sampling, for enabling the control of said sensed error condition prior to said periodic sampling.

2. The error management system in the communication network of claim 1 wherein said means for monitoring, said means for recording, said means for sampling and means for sensing are in said server computer.

3. The error management system in the communication network of claim 2 wherein said means for enabling the sensing of said error condition comprises a tap for duplicating data representative of said error conditions being recorded in said error log.

4. The error management system in the communication network of claim 3 wherein said error condition is controlled on a real-time basis.

5. The error management system in the communication of claim 2 wherein:
   said communication network is the World Wide Web; and
   said client stations are stations on the Web.

6. In a computer managed communication network with user access via a plurality of client computer stations connected to the network through a server computer, an error management method comprising:
   monitoring error conditions;
   recording said monitored error conditions in an error log;
   periodically sampling said error log for said error conditions;
   enabling the sensing of at least one of said monitored error conditions prior to the recording of the condition in the error log to thereby bypass said error log sampling for said at least one error condition; and enabling the control of one of said sensed error conditions prior to said periodic sampling responsive to the sensing of said error condition prior to said periodic sampling.

7. The error management method in a communication network of claim 6 wherein said step of monitoring, recording, sampling and sensing are carried out in said server computer.

8. The error management method in a communication network of claim 7 wherein said step of enabling the sensing of said error condition comprises duplicating data representative of said error conditions prior to said data being recorded in said error log.

9. The error management method in a communication network of claim 8 wherein said error condition is controlled on a real-time basis.

10. The error management method in a communication of claim 7 wherein:
    said communication network is the World Wide Web; and
    said client stations are stations on the Web.

11. A computer program having code recorded on a computer readable medium for error management in a computer managed communication network with user access via a plurality of client computer stations connected to the network through a server computer comprising:

means for monitoring error conditions;

means responsive to said monitoring means for recording said error conditions in an error log;

means for periodically sampling said error log for said error conditions; and means responsive to said monitoring means for enabling the sensing of at least one of said error conditions prior to the periodic sampling of the condition to thereby bypass said error log sampling; and means, responsive to he sensing of one of said error conditions prior to said periodic sampling, for enabling the control of said sensed error condition prior to said periodic sampling.

12. The computer program of claim 11 wherein said means for monitoring, said means for recording, said means for sampling and means for sensing are in said server computer.

13. The computer program of claim 12 wherein said means for enabling the sensing of said error condition comprises a tap for duplicating data representative of said error conditions being recorded in said error log.

14. The computer program of claim 13 wherein said error condition is controlled on a real-time basis.

15. The computer program of claim 13 wherein:

said communication network is the World Wide Web; and said client stations are stations on the Web.

\* \* \* \* \*